United States Patent
Marin et al.

(10) Patent No.: US 10,505,710 B2
(45) Date of Patent: Dec. 10, 2019

(54) ELECTRONIC CALCULATING DEVICE

(71) Applicant: KONINKLIJKE PHILIPS N.V., Eindhoven (NL)

(72) Inventors: Leandro Marin, Eindhoven (NL); Alphons Antonius Maria Lambertus Bruekers, Nederweert (NL); Paulus Mathias Hubertus Mechtildus Antonius Gorissen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 55 days.

(21) Appl. No.: 15/535,758

(22) PCT Filed: Dec. 21, 2015

(86) PCT No.: PCT/EP2015/080760
§ 371 (c)(1),
(2) Date: Jun. 14, 2017

(87) PCT Pub. No.: WO2016/102445
PCT Pub. Date: Jun. 30, 2016

(65) Prior Publication Data
US 2017/0353294 A1 Dec. 7, 2017

(30) Foreign Application Priority Data
Dec. 22, 2014 (EP) .................................. 14199622

(51) Int. Cl.
*H04L 9/00* (2006.01)
*G06F 7/72* (2006.01)

(52) U.S. Cl.
CPC .............. *H04L 9/002* (2013.01); *H04L 9/008* (2013.01); *G06F 7/729* (2013.01); *H04L 2209/16* (2013.01)

(58) Field of Classification Search
CPC ..... H04L 9/002; H04L 9/008; H04L 2209/16; G06F 7/729
(Continued)

(56) References Cited

U.S. PATENT DOCUMENTS 4,418,394 A * 11/1983 Tai .......................... G06E 1/065
708/191
4,949,294 A * 8/1990 Wambergue ............ G06F 7/729
708/491

(Continued)

FOREIGN PATENT DOCUMENTS

JP 2011513787 A 4/2011
JP 2012129993 A 7/2012
(Continued)

OTHER PUBLICATIONS

Aspire Advanced Software Protection: Integration, Research and Exploitation; "Early White-Box Cryptography and Data Obfuscation Report"; Project No. 609734, Oct. 2014, 64 page document.
(Continued)

*Primary Examiner* — Shahriar Zarrineh (57) ABSTRACT

An electronic calculating device (100) arranged to perform obfuscated arithmetic in a commutative ring $(Z_M; Z_n[x]/M(x))$ defined by a combined modulus (M; M(x)) in a residue number system, the residue number system being defined for a series of moduli $(m_1, m_2, \ldots, m_N)$, each modulus defining a commutative ring $(Z_{M_i}; Z_n[x]/m_i(x))$, for each modulus $(m_i)$ of the series there exists an associated base element $(u_i)$ satisfying the condition that each ring element $(x_j)$ modulo the modulus $(m_j)$ may be expressed as an integer-list $((a_j, b_j))$ such that the ring elements equal a linear combination of powers of the base element $(xj=u_i^{a_j}-u_i^{b_j})$, wherein the powers have exponents determined by the integer-list.

17 Claims, 3 Drawing Sheets

(58) Field of Classification Search
USPC .......................................................... 380/28
See application file for complete search history.

(56) References Cited

U.S. PATENT DOCUMENTS

| | | | | |
|---|---|---|---|---|
| 5,069,547 | A * | 12/1991 | Huggins | G01D 5/2497 250/237 G |
| 5,270,956 | A * | 12/1993 | Oruc | G06F 7/72 380/28 |
| 6,760,742 | B1 * | 7/2004 | Hoyle | G06F 7/724 708/492 |
| 8,479,018 | B2 | 7/2013 | Futa et al. | |
| 8,595,513 | B2 | 11/2013 | Adjedj | |
| 8,670,559 | B2 | 3/2014 | Michiels et al. | |
| 9,288,039 | B1 | 3/2016 | Monet et al. | |
| 2003/0044004 | A1 | 3/2003 | Blakley et al. | |
| 2004/0139340 | A1 * | 7/2004 | Johnson | G06F 21/14 713/194 |
| 2005/0002532 | A1 | 1/2005 | Zhou et al. | |
| 2008/0069345 | A1 * | 3/2008 | Rubin | H04L 9/0841 380/44 |
| 2008/0208560 | A1 * | 8/2008 | Johnson | G06F 21/14 703/22 |
| 2011/0010141 | A1 | 1/2011 | Jabir | |
| 2011/0246787 | A1 | 10/2011 | Farrugia et al. | |
| 2013/0329883 | A1 | 12/2013 | Tamayo-Rios | |
| 2015/0067874 | A1 * | 3/2015 | Johnson | G06F 21/14 726/26 |
| 2015/0186627 | A1 * | 7/2015 | Teuwen | G06F 21/14 713/190 |
| 2015/0215123 | A1 | 7/2015 | Kipnis et al. | |
| 2017/0109539 | A1 * | 4/2017 | Kinasz | H04L 9/00 |
| 2017/0220320 | A1 * | 8/2017 | Marin | G06F 7/72 |
| 2017/0324544 | A1 * | 11/2017 | Marin | H04L 9/002 |

FOREIGN PATENT DOCUMENTS

| | | |
|---|---|---|
| RU | 2467389 C1 | 11/2012 |
| SU | 1667059 A2 | 7/1991 |
| WO | 2004112307 A2 | 12/2004 |
| WO | 2009076669 A1 | 6/2009 |
| WO | 2014016795 A2 | 1/2014 |
| WO | 2016050884 A1 | 4/2016 |

OTHER PUBLICATIONS

Chow et al: "White-Box Cryptography and an AES Implementation"; LNCS 2595, pp. 250-207, 2003.
Dardaillon et al: "Hardware Implementation of the GPS Authentication"; IEEE 2012, pp. 1-6.
Kerl: "Computation in Finite Fields"; Arizona State University and Lockheed Martin Corporation, Apr. 2004, 90 page document.
Wikipedia; "Lattice Multiplication" Document Downloaded from https://en.wikipedia.org/wiki/Lattice_multiplication, last updated on Apr. 24, 2017, 3 page document.
Zhu et al: "A Provable Scheme for Homomorphic Obfuscations in Software Security"; Proceedings of the IASTED International Conference on Communication, Network, and Information Security, Jan. 2006, pp. 1-5.
Omondi et al: "Residue Number Systems, Theory and Implementation"; Advances in Computer Science and Engineering:Tests, vol. 2, Published by Imperial College Press, 2007.

* cited by examiner

ELECTRONIC CALCULATING DEVICE

CROSS-REFERENCE TO PRIOR APPLICATIONS

This application is the U.S. National Phase application under 35 U.S.C. § 371 of International Application No. PCT/EP2015/080760, filed on Dec. 21, 2015, which claims the benefit of European Patent Application No. 14199622.3 filed on Dec. 22, 2014. These applications are hereby incorporated by reference herein.

FIELD OF THE INVENTION

The invention relates to electronic calculating device arranged to perform obfuscated arithmetic in a commutative ring.

The invention further relates to an electronic calculating method, a computer program, and a computer readable medium.

BACKGROUND

In white-box cryptography and more in general software obfuscation, computations are often performed on encoded values instead of plain values. Reverse engineering of the obfuscated software is harder if computations are performed on encoded values, instead of on the plain values themselves.

After the encoding, regular operations, like addition or multiplication, can no longer be performed using a computer's built-in primitives. The straightforward addition of encoded values does not normally result in the encoding of the addition of the values. The same holds for multiplication. In a formula: $E(x)+E(y) \neq E(x+y)$, for most x and y; E denotes the encoding function.

A solution to this problem is to introduce addition (A) and multiplication (M) tables. The tables take two encoded values as input and produce an encoded value as output that corresponds to the encoding of the addition or multiplication operation. The tables may be defined as: $A(E(x),E(y))=E(x+y)$; $M(E(x),E(y))=E(xy)$. These tables allow arithmetic to be performed directly on encoded values.

The obfuscated addition and multiplication using tables suffers from at least two drawbacks. First, the tables can become quite large. If x and y are represented as l bits, each table needs $2^{2l}l$ bits.

Second, such large tables may be easily found in software. Worse, the tables might still be identified as addition or multiplication operations even though they are encoded; for example, through properties of these functions that are preserved in the encoding. For example, the multiplication table satisfies $M(E(0),E(x))=E(0)$. An attacker may use this and similar properties to guess which operation the tables represent.

SUMMARY OF THE INVENTION

In a previous application by the same applicant an improved way to perform obfuscated arithmetic was presented. The previous application was filed with the European Patent Office (EPO) under title "Electronic calculating device for performing obfuscated arithmetic", Filing date: 30 Sep. 2014, application Ser. No. 14/186,951.1. The previous application is included herein by reference in its entirety, and in particular also for its description of calculation devices using homogenous obfuscation over an integer ring.

The inventors had found that in some cases multiplication and addition on encoded values may be performed using a single table without having to encode multiple values into a single encoded value. Because the same table is used for addition and multiplication it would be hard to see during reverse engineering if an addition or a multiplication is performed. Because addition and multiplication appear to be the same operation when viewed from the outside, the inventors have termed this method 'homogenous obfuscation'. Even if an attacker were able to find the table that is used, and even if he were able to figure out somehow its function as an increment table, he still would not know whether addition or multiplication operations are performed. The way the table acts on element of the integers list, will differ for addition and multiplication, however this may be easily hidden using traditional obfuscation. In addition, the single table that is used is also smaller than the one discussed in the background: approximately $2^l l$ bits are needed. Even if only addition is used, the table needed for obfuscated addition is smaller than the table suggested in the background.

For example, a ring element may be encoded as two integers (a,b). Arithmetic can be performed directly on the encoding using an increment table that maps an encoded ring element to the encoded ring element plus an increment value. For example, the table may map (a,b) to (c,d) if $u^c-u^d=u^a-u^b+1$. Both the addition and multiplication are performed by repeated applications of the increment table.

The obfuscated arithmetic applies to many different commutative rings R, although not each and every ring allows encoding as integer lists. Commutative rings are a mathematical concept that includes many different familiar mathematical structures, e.g., the integers modulo a number ($\mathbb{Z}_n$) or the polynomials modulo a number and a polynomial ($\mathbb{Z}_n[x]/f(x)$). Fields are a special case of commutative rings.

Note that the latter two types of commutative rings are conventionally defined by a modulus operation. For example, the integers modulo an integer ($\mathbb{Z}_M$) are fully defined by the integer modulus (M). Likewise, polynomial rings ($\mathbb{Z}_n[x]/M(x)$) are defined by modulus (M(x)). The polynomial coefficients are modular coefficient, i.e., integers modulo an integer (n).

Although homogenous obfuscation is advantageous over conventional forms of obfuscation, e.g., because of smaller tables, there is a need to extend the range of homogenous obfuscation to larger integers. The size of tables grows more than linear with the size of the underlying ring.

An advantageous way to accomplish this is to compute in a commutative ring defined by a combined modulus (M) in a residue number system, the residue number system being defined for a series of moduli ($m_1, m_2, \ldots, m_N$). An operand storage is arranged to store one or more operands modulo the combined modulus (M) as one or more series of ring elements modulo the moduli, each ring element of a series being associated with a corresponding modulus of the series of moduli. A calculation unit is arranged to add and/or multiply a first and second operand of the operand storage according to the ring element number system. Advantageously, at least one ring element of the series on which the calculation unit acts is encoded as an integer-list. This allows the residue number system to be obfuscated using homogenous obfuscation.

In an embodiment, the calculation unit operates on said integer-list, said operating comprising modulo-operations modulo the order of the base elements, the order of at least two base elements associated with two different moduli of the series of moduli being equal. Homogenous obfuscation operations involve a modulo-operation wherein the modulus is the order of the base element. Thus even though the moduli are different, the actual modulo-operations may be the same. This reduces code size and improves obfuscation; one cannot tell from the modulus operation for which modulus it was performed. For example, the calculation unit may be arranged to retrieve both integers of the integers lists to perform an addition and/or multiplication operation.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

The electronic computation device may be mobile electronic device, e.g. a mobile phone, or a set-top box, a computer, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of an electronic calculating device, FIG. 1b schematically shows an example of a residue modulo a first modulus, FIG. 2 schematically shows an example of an embodiment of an electronic calculating device, FIG. 3 schematically shows an example of an embodiment of an electronic calculating method.

LIST OF REFERENCE NUMERALS IN FIGS. 1-2

100 an electronic calculating device
101 a first operand
106 a second operand
102, 107 a residue modulo a first modulus
103, 108 a residue modulo a second modulus
104, 109 a residue modulo a third modulus
102.1, 102.2 an integer
107.1, 107.2 an integer
110 an operand storage
120 a table storage
121 a series of tables
122 an increment table for the first modulus
123 an increment table for the second modulus
124 an increment table for the third modulus
130 a calculation unit
131 a series of addition units
132 a first addition unit
133 a second addition unit
134 a third addition unit
136 a series of multiplication units
137 a first multiplication unit
138 a second multiplication unit
139 a third multiplication unit
141 a series of modulo-operators
142 a modulo-operator for the order of a first base element modulo the first modulus
143 a modulo-operator for the order of a second base element modulo the second modulus
144 a modulo-operator for the order of a third base element modulo the third modulus
200 an electronic calculating device
230 a calculation unit
232 an addition unit
237 a multiplication unit
242 a modulo-operator

DETAILED DESCRIPTION OF EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for sake of understanding, elements of embodiments are described in operation. However, it will be apparent that the respective elements are arranged to perform the functions being described as performed by them.

Figure 1A:
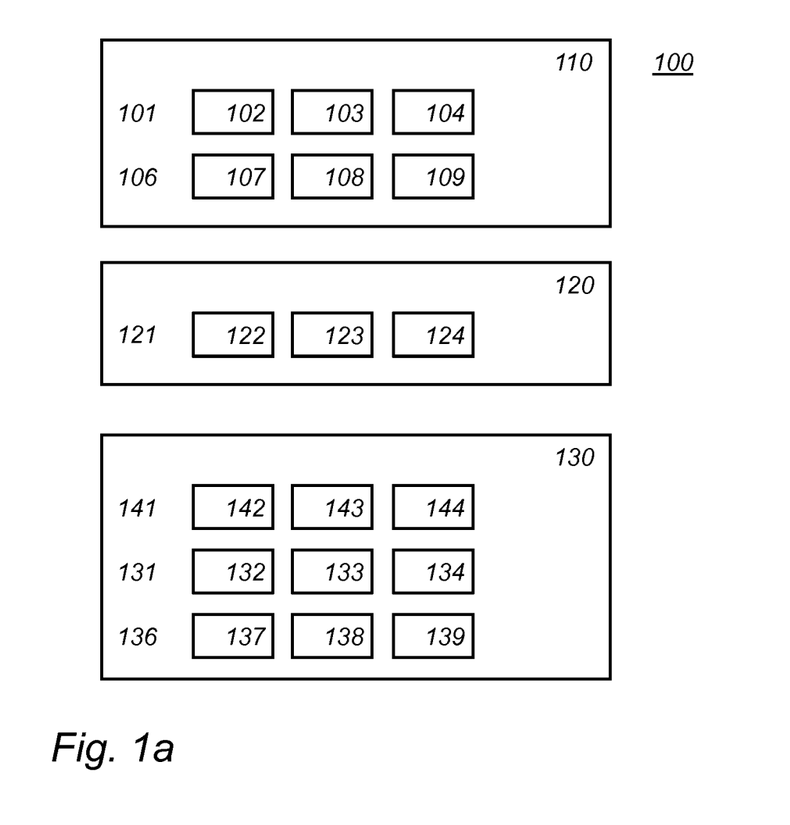

FIG. 1a schematically shows an example of an embodiment of an electronic calculating device 100.

Calculating device 100 comprises an operand storage 110. Operand storage 110 is arranged to store one or more operands on which calculations are to be performed. Calculations include addition operations. Calculations may also include multiplication operations. By combining addition and/or multiplication operations and control logic additional operations may be constructed, e.g., subtraction and division operations.

FIG. 1a shows two operands stored in operand storage 110: operand 101 and operand 106. Although FIG. 1a shows only two operands, there may be more operands. The operands represent a residue modulo a combined modulus (M). The operands are represented in a manner suitable for the residue number system. The residue number system is defined by a series of moduli $(m_1, m_2, \ldots, m_N)$. Each modulus defines a commutative ring. In an embodiment, the moduli are all integer or they are all polynomials. In the latter case, the polynomials have coefficients which are themselves taken from the same ring for all polynomials. The coefficients of these polynomials may be modular coefficients, i.e., integers modulo a modulus. The modulus used to define the ring for the coefficients is the same for all moduli.

In case a modulus $m_i$ of the series of moduli is an integer, the corresponding ring is denoted as $\mathbb{Z}_{m_i}$. In case a modulus $m_i(x)$ of the series of moduli is a polynomial, the corresponding ring is denoted as $\mathbb{Z}_n[x]/m_i(x)$. In the latter example, the common modulus for coefficients of the polynomials is denoted as n.

The combined modulus may be taken as the least common multiple of the moduli $(m_1, m_2, \ldots, m_N)$ in the series of moduli. In case the moduli are pairwise prime, the combined modulus may be taken as the product of the moduli. To represent a number x modulo the combined modulus in the residue number system the number is mapped to the series $x_i = x \bmod m_i$, wherein $m_i$ runs through the moduli $m_1$ to $m_N$. In an embodiment, the combined modulus is a proper divisor of the least common multiple, mentioned above. This has the disadvantage that the space of numbers that can be represented is smaller, but on the other hand numbers get multiple representations, which may be desired in some embodiments of obfuscated calculations.

An operand stored in the operand storage 110 is represented as a series of ring elements modulo the moduli. Although each ring element of a series is associated with a corresponding modulus of the series of moduli, there is no need to store the series in order. For example, a series may be stored distributed throughout the operand storage.

FIG. 1a shows the first operand 101 stored as a series of three residues: a residue 102 modulo a first modulus, a 103 residue modulo a second modulus, and a residue 104 modulo a third modulus. Similarly, second operand 106 is stored as a series of three residues: a residue 107 modulo a first modulus, a residue 108 modulo a second modulus, and a residue 109 modulo a third modulus. The first, second and third residues are residues modulo $m_1$, $m_2$ and $m_3$ respectively. There may be a different number of moduli, say only two moduli or more than 3. Typically, all moduli are different. In an embodiment, the moduli are pair wise prime. For pair wise prime moduli, the combined modulus may be taken as the product of the moduli, which makes the combined modulus relatively large.

Calculation device 100 comprises a calculation unit 130 arranged to add and/or multiply a first and second operand of the operand storage according to the residue number system. For example, consider two operands x and y, e.g., operands 101 and 106, represented as two series $x_i$ and $y_i$ (in series of operands the index runs to address all moduli, e.g., from 1 to N). To add the two operands, the calculation device may compute the series $x_i + y_i \bmod m_i$; note that each element of the series is computed modulo the corresponding modulus of the series of moduli. Similarly, to multiply the two operands, the calculation device may compute the series $x_i \cdot y_i \bmod m_i$; also herein is each element of the series computed modulo the corresponding modulus of the series of moduli. It is a result of the residue number system that this results in the representation of the addition and multiplication modulo the combined modulus. The latter is proven by the so-called Chinese remainder theorem.

For at least one of the latter addition or multiplication operations homogenous obfuscation is used. This implies that the actual computation that is performed includes a modulo-operation for a different modulus than the modulus $m_i$ itself. Thus, although functionally an addition or multiplication modulo a particular modulus $m_i$ is done, the actual computation only shows a modulo-operation for a different number. This curious situation is one of the consequences of homogeneous obfuscation and is further explained below and in the cited previous application.

The moduli $m_i$ in this embodiment have been specially chosen so that they allow homogenous obfuscation. In particular for each modulus $(m_j)$ of the series there exists an associated base element $(u_i)$ satisfying the condition that each ring element $(x_j)$ modulo the modulus $(m_j)$ may be expressed as an integer-list $(a_j, b_j)$ such that the ring elements equal a linear combination of powers of the base element, wherein the powers have exponents determined by the integer-list. The canonical way to represent a ring element $x_j$ as a linear combination of powers is by representing a ring element $x_j$ as a difference between two powers of the base element; the exponents of the powers being comprised in the integer list. For example, each ring element $x_j$ modulo $m_j$ may be written as $x_j = u_i^{a_j} - u_i^{b_j}$. We will also refer to this representation as the example representation. There are different ways to represent a ring element though, e.g., $x_j = u_i^{a_j} + u_i^{b_j}$. More examples are given in the previous application.

Figure 1B:
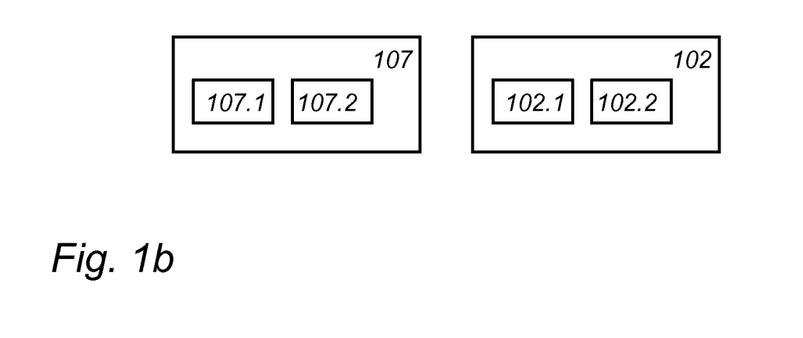

FIG. 1b schematically shows an example of a residue modulo a first modulus. Shown are a list of integers, comprising the integers 107.1 and 107.2. For example, the residue 107 may be represented by two integers 107.1 and 107.2, such that the represented residue is a linear combination of powers of the base element $(x_j = u_i^{a_j} - u_i^{b_j})$, wherein the powers have exponents determined by the integer-list. In this example, integer 107.1 could be $a_j$ and integer 107.2 could be $b_j$. The residue in operand 102 for the same modulus is also represented as an integer list, using integers 102.1 and 102.2. In an embodiment, the integers in the integer lists are between 0 and the order of the base element minus 1 (inclusive).

The other residues in storage 110, e.g., 102, 103, 104, 108, 109 may be similarly stored. In an embodiment, all ring elements in a series associated with a particular modulus are represented as an integer list. For example, if ring element 107 is represented as an integer list, then the corresponding ring element 102 may also be represented as an integer list using the same base element; this allows computations involving both element 107 and 102 to be performed using homogenous obfuscation.

Performing arithmetic on residues using homogenous obfuscation generally involves two types of operations: arithmetic on the integers in the integer list modulo the order of the base element, and application of a table. The latter table is termed the increment table, since it adds a fixed element to a ring element determined from the integers in the integer list. There are different ways to organize these calculations. Below it is explained how this may be done for the example representation, more examples are given in the previous application.

Returning to FIG. 1a, calculation device 100 comprises a table storage 120. Table storage 120 is arranged to store, for each of the moduli in the series an increment table (T) defined for an increment element (−1; 1; $u^t$), associated to a modulus of the series of moduli. In the example of FIG. 1, there are three different moduli, each one associated to one of three base elements, and each associated with an increment table. Table storage 120 stores a series of increment tables 121. The series comprises increment tables 122, 123 and 124. We may denote the tables as $T_i$ corresponding to modulus $m_i$ and base element $u_i$. The moduli and base elements are not needed during the computations, and need not be explicitly stored in calculation device 100; however, the increment tables are required to perform the calculation. An increment table depends on the modulus, the base element, the chosen linear mapping between powers and ring elements, and the increment value.

An increment table maps an input ring element (e.g. $k=u^{k_1}-u^{k_2}$) to an output integer-list (e.g., $T((k_1,k_2))=(l_1,l_2)$) encoding an output ring element (e.g., $l=u^{l_1}-u^{l_2}$), such that the output ring element equals the increment element added to the input ring element (e.g. $l=k+1$), the output ring element equals a linear combination of powers of the base element (u), wherein the powers have exponents determined by the output integer-list.

The increment value may be 1, but that is not needed; it may also be −1, or a power of the base element, and other values.

Returning to calculation unit 130: As noted, using the residue number system additions and multiplications modulo the combined modulus may be performed by performing a series of separate calculations, each modulo one of the series of moduli. For example, calculation unit 130 may comprise a series of addition units 131, and a series of multiplication units 136. If no multiplication operations are desired, the multiplication units may be omitted. Each one of the addition and/or multiplication units calculates modulo one of the moduli. FIG. 1 shows addition units 132, 133 and 134 and multiplication units 137, 137, and 139.

Calculation unit 130 also comprises a series of modulo-operators 141, e.g. implemented as modulo units. The modulo-operators perform a modulo-operation modulo the order of the base element associated with a modulus of the series of moduli. Note that the modulo-operators 141 are not arranged to perform modulo-operations modulo the moduli in the series themselves. Although functionally modulo-operations modulo the moduli in the series are calculated, when encoded using homogenous obfuscation the actual calculation that is performed is a modulo-operation modulo the order of the base element. That modulo-operations modulo a different number, i.e., the order of base element, can realize a modulo-operation, in the encoding, is caused by the homogenous obfuscation. The modulo-operators 141 are used by the respective addition and multiplication units 131 and 136.

In summary, operands are represented as a residue modulo a number of different moduli. A base element and a table are associated with each modulus. At least one, but possibly all, of the residues are represented as integer lists; the representation depending on the base element associated with the modulus of the residue. A modulo-operation using the order of the base element associated with the modulus is used by one or more addition units and multiplication units. In the example of FIG. 1a, residues 102, and 107 are for the same modulus, table 122 is for a base element associated with that modulus, addition unit and multiplication units 132 and 137 operate modulo that modulus using the modulo-operator 142. The same holds similarly for the other moduli.

In FIG. 1a, all elements associated with the same modulus of the series of moduli are arranged in a vertical column. In this example, three different moduli were used. It is also possible to use two moduli, or more than 3.

It is not necessary that all residues modulo the moduli in the series of moduli are encoded using homogenous obfuscation, i.e., represented as an integer list. For example, some may be represented as plain values, e.g., as integers modulo the associated modulus. For example, some may be encoded in a different manner, say using traditional non-homogenous table based encoding. As the residue number system operates on each modulus separately, such different encodings may be used side by side. In the following examples, we will assume that all residues in a series for an operand are represented using homogenous obfuscated as an integer list.

In operation, calculation unit 130 may add operands 101 and 106. This may be done as follows: Addition or multiplication unit 131 or 136 operates on integers lists 102 and 107 to obtain an intermediate integer-list; a modulo-operation is applied to each element in the intermediate integer-list using the modulo-operator 142, i.e., modulo the base of the associated base element. The table 122 is applied to the resulting intermediate integer-list. The addition or multiplication unit may continue to operate on the result of the table application and integer lists 102 and/or 107, perform a second modulo-operation using modular operator 142 and apply table 122 again. More detailed descriptions of the addition and multiplication operations may be found in the previous application. Similar operations are performed for the other moduli.

The result is a representation of the addition or multiplication in integer list representation. This result may be stored in operand store 110, and used for future computations. Other operations may be implemented by combining the addition and multiplication operations.

The previous application gives many examples of integer rings (the integers modulo an integer modulus) or polynomial rings (polynomials with modular coefficients modulo a polynomial modulus).

Figure 2:
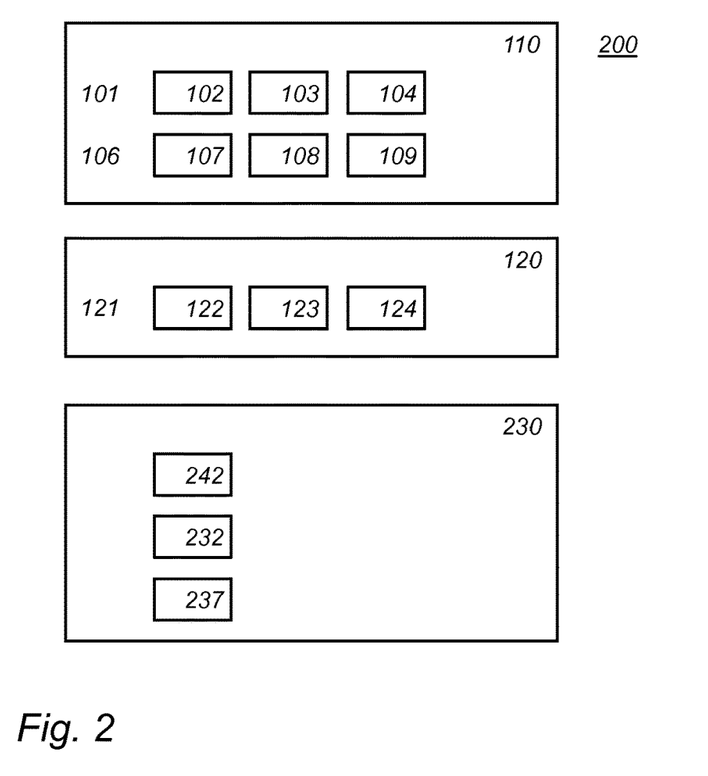

FIG. 2 schematically shows an example of an embodiment of an electronic calculating device 200. Device 200 is based on device 100. Operand storage 110 and table storage 120 may be the same in device 200 as in device 100. Device 200 differs in its choice of moduli and base elements and of calculation device 230.

For device 200 the order of at least two base elements associated with two different moduli of the series of moduli are equal. More preferably, all the orders of all base elements associated with the moduli of the series of moduli are equal. As in device 100 the combined modulus may be equal to the least common multiple of the moduli $(m_1, m_2, \ldots, m_N)$ in the series of moduli. FIG. 2 shows the situation in which all orders are the same.

If two base elements have the same order, even though the base elements are associated with a different modulus, the modulo-operator may be shared for the modulo-operations for that modulus. Note that each modulus continues to have its own increment table in table storage 120. If the order of the base element of different moduli is the same the operations on the integers lists are all the same, including the modulo-operation as it is modulo the order of the base element. However, the table operation remains unique for each different modulus. Therefore to a high degree computations for different moduli are identical, only a different increment table is used. Even the size of the increment tables may be the same, as the size of the increment table may depend on the order of base element. (Note in advanced operations the difference between the integers in the integer list is restricted to an allowed difference set. This may cause the size of the increment tables to be different for different moduli).

The calculation unit 230 shown in FIG. 2 comprises a modulo-operator 242, an addition unit 232 and a multiplication unit 237.

In operation, calculation unit 230 may add operands 101 and 106. This may be done as follows: Addition or multiplication unit 232 or 237 operates on integers lists 102 and 107 to obtain an intermediate integer-list; a modulo-operation is applied to each element in the intermediate integer-list using the modulo-operator 242, i.e., modulo the base of the associated base element. The table 122 is applied to the resulting intermediate integer-list. The addition or multiplication unit may continue to operate on the result of the table application and integer lists 232 and/or 237, perform a second modulo-operation using modular operator 242 and apply table 122 again.

Similar operations are performed for the other moduli. For example: Addition or multiplication unit 232 or 237 operates on integers lists 103 and 108 to obtain an intermediate integer-list; a modulo-operation is applied to each element in the intermediate integer-list using the modulo-operator 242, i.e., modulo the base of the associated base element. The table 123 is applied to the resulting intermediate integer-list. The addition or multiplication unit may continue to operate on the result of the table application and integer lists 232 and/or 237, perform a second modulo-operation using modular operator 242 and apply table 123 again. Etc.

Addition and multiplication units 232 and 237 are arranged to apply the increment table corresponding to the moduli to calculations modulo a modulus of the series. Alternatively, addition and multiplication units 232 and 237 may be implemented as a series of addition and multiplication units as in FIG. 1. Each unit of said series is arranged for a particular increment table, but using modulo-operator 242.

An advantage of using a single modulo-operator 242 is that one cannot tell from the calculation software for which modulo-operation a calculation is performed.

The Residue Number System (RNS) allows using small moduli in order to make computations over a larger modulus. The following moduli all have a base element of order 30. An example of such a base element of order 30 is given below for each modulus.

|  | Modulus | | | | | | | | | |
| --- | --- | --- | --- | --- | --- | --- | --- | --- | --- | --- |
|  | 93 | 99 | 143 | 151 | 181 | 183 | 209 | 211 | 231 | 241 |
| Base element | 14 | 5 | 4 | 23 | 36 | 56 | 27 | 10 | 53 | 10 |

One may use the moduli to create an RNS number system. For example, two selections of these moduli are possible, which have a combined modulus larger than $2^{32}=4294967296$.

$$93*143*181*209*231=116213298201$$

$$99*151*183*211*241=139111402617$$

Note that all moduli in these two sets are coprime. Thus using operations which uses only elements that fit in a byte, operation on 32-bit words may be computed. For a full description of RNS and Mixed Radix System see for example Omondi, A., Prekumar, B.: Residue Number Systems. Theory and Implementation. Imperial College Press.

A polynomial residue number system may be similarly constructed. For example, select a number of co-prime polynomials which allow homogenous obfuscation over the same base ring. The corresponding RNS system allows obfuscated computations on much larger polynomials, e.g., modulo the product of the selected polynomials.

Operand store 110, and table store 120 may be implemented as electronic memory. They may be combined into a single store, e.g., as a single electronic memory. Increment tables may be implemented as look-up tables.

Typically, the devices 100 and 200 each comprise a microprocessor (not shown) which executes appropriate software stored at the device 100 and 200; for example, that software may have been downloaded and/or stored in a corresponding memory, e.g., a volatile memory such as RAM or a non-volatile memory such as Flash (not shown). Alternatively, the devices 100 and 200 may, in whole or in part, be implemented in programmable logic, e.g., as field-programmable gate array (FPGA). Devices 100 and 200 may be implemented, in whole or in part, as a so-called application-specific integrated circuit (ASIC), i.e. an integrated circuit (IC) customized for their particular use. Table and operand storage may be implemented as electronic memory, magnetic storage and the like. The memory may be volatile or non-volatile.

Figure 3:
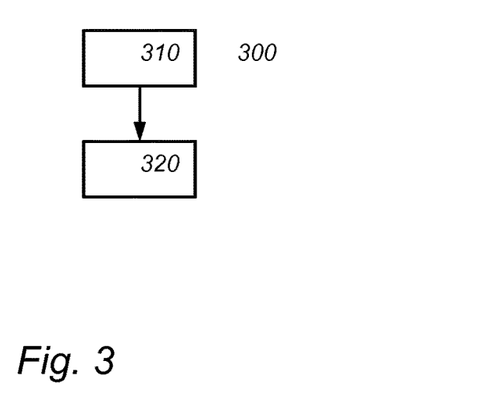

In an embodiment, the device comprises an operand storage circuit, and a calculation circuit. The device may comprise additional circuits, e.g., one or more of a modular operation circuit, addition circuit, multiplication circuit, and table storage circuit; the circuits implementing the corresponding units described herein. The circuits may be a processor circuit and storage circuit, the processor circuit executing instructions represented electronically in the storage circuits. The circuits may also be, FPGA, ASIC or the like. FIG. 3 schematically shows an example of an embodiment of an electronic calculating method 300. The electronic calculating method is arranged to perform obfuscated arithmetic modulo a combined modulus (M) in a residue number system. The residue number system is defined for a series of moduli ($m_1, m_2, \ldots, m_N$), each modulus defining a commutative ring ($\mathbb{Z}_{m_1}$; $\mathbb{Z}_n[x]/m_1(x)$). For each modulus ($m_i$) of the series there exists an associated base element ($u_i$) satisfying the condition that each ring element ($x_j$) modulo the modulus ($m_j$) may be expressed as an integer-list (($a_j, b_j$)) such that the ring elements equal a linear combination of powers of the base element ($x_j = u_i^{a_j} - u_i^{b_j}$) wherein the powers have exponents determined by the integer-list. The method comprising storing 310 one or more operands modulo the combined modulus (M) as one or more series of ring elements modulo the moduli, each ring element of a series being associated with a corresponding modulus of the series of moduli, wherein at least one ring element of the series is encoded as an integer-list,
adding and/or multiplying 320 a first and second operand of the operand storage according to the ring element number system.

The method may be extended, e.g., as described with reference to FIGS. 1a, 1b and 2.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform method 300. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 4A:
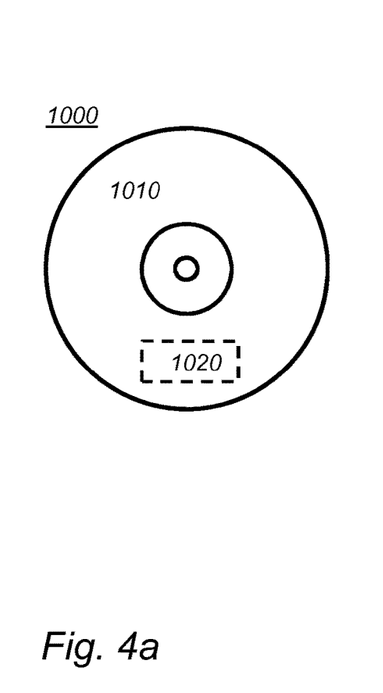
FIG. 4a shows a computer readable medium having a writable part comprising a computer program according to an embodiment.

FIG. 4a shows a computer readable medium 1000 having a writable part 1010 comprising a computer program 1020, the computer program 1020 comprising instructions for causing a processor system to perform a method of obfuscated arithmetic, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method of obfuscated arithmetic.

Figure 4B:
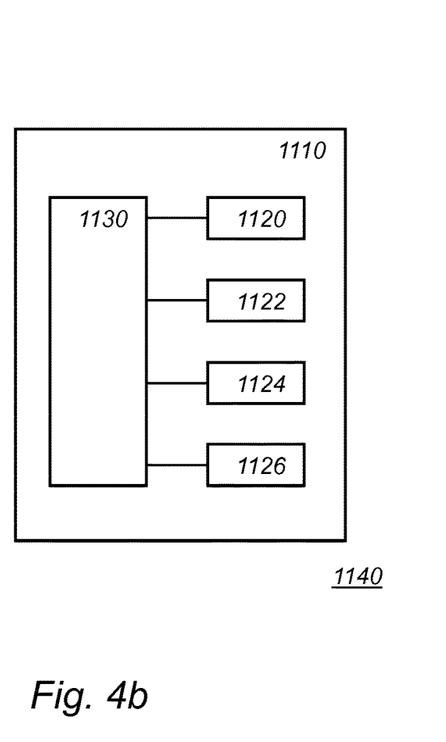
FIG. 4b shows a schematic representation of a processor system according to an embodiment.

FIG. 4b shows in a schematic representation of a processor system 1100 according to an embodiment. The processor system comprises one or more integrated circuits 1110. The architecture of the one or more integrated circuits 1110 is schematically shown in FIG. 4b. Circuit 1110 comprises a processing unit 1120, e.g. a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

In the previous application cited above examples are given of an embodiment of a calculating device for performing obfuscated arithmetic in a commutative ring. The homogenous obfuscation is applied in embodiments herein to the individual moduli of the series of moduli The calculating device may be applied in device 100 or 200, e.g. to implement the addition and/or multiplication unit. The calculation device and method performs obfuscated arithmetic in a finite commutative ring. One example that was given of such rings is the integers modulo a number ($\mathbb{Z}_n$). The generation device according to an embodiment finds a modulus such that the ring formed by the integers modulo that modulus ($\mathbb{Z}_n$) allows for obfuscated arithmetic. A base element needed to encode and decode ring elements, e.g., integers, in and out of the obfuscated domain is also generated.

Homogenous obfuscation, e.g., representing ring elements, in particular integers modulo a modulus, is a type of encrypted arithmetic; sometimes also referred to as homomorphic encryption. Using obfuscation, e.g., computer software code is protected against reverse-engineering of the code. The obfuscation here is of the part of the code that performs arithmetic. In an embodiment of the digital obfuscated arithmetic computations may be carried out on ciphertext and generate an encrypted result which, when decrypted, matches the result of operations performed on the plaintext. In other words, going beyond some traditional software obfuscation, arithmetic may be executed on encrypted values. Nevertheless, arithmetic implemented using homogenous obfuscation may be functionally identical to arithmetic performed on plain values.

The elements of the ring may be defined as the integers modulo the modulus. The elements of the ring are referred to as ring elements. The ring elements may also be called residues. A ring element may be digitally represented as an integer between 0, and the modulus minus 1; 0 and the modulus minus 1 being included. On the ring elements an addition and a multiplication is defined, the latter are referred to as the ring-addition and the ring-multiplication.

Ring elements may be represented in any suitable form, should that be needed. For example, elements of $\mathbb{Z}_n$ may be represented as integers. However, in the calculation device, ring elements are represented as integer-lists. For example, a ring element a may be represented in the calculation device by a list ($a_1$, $a_2$). An integer-lists encodes a ring-element according to some mapping between ring elements and integers list; given any ring-element there is at least one integer list that represents the ring-element, and given any integer list, there is exactly one ring element that it represents. In embodiments any ring element may be represented as an integer list.

The integer lists have at least two elements. As it turns out, the addition and multiplication operations require fewer steps if the integer list is shorter. Accordingly, in an embodiment the integer lists always have two elements. In the main description we will assume that the integer lists are integer pairs, however, examples of integer lists having more than two elements are provided in the previous application. As an example, the $(a_1, a_2)$ may map to the ring element $(u^{a_1}-u^{a_2})$, wherein u is a special ring element, referred to as a base ring element. Many variants are discussed in the previous application, including using multiple base elements. However in the main discussion we will assume as 'the example encoding' that a given integer list $(a_1, a_2)$ maps to the ring element $(u^{a_1}-u^{a_2})$. Each ring element can thus be expressed as a difference between two powers of the base element u.

Below a number of examples of obfuscated arithmetic using a modulus and base element, e.g., as generated by a generation device according to an embodiment, are presented. Examples are given of encodings, increment tables, ring addition methods and ring multiplication methods. The negation, addition and multiplication units of the calculation device may be configured for any of these embodiments. All examples apply to the commutative ring $\mathbb{Z}_n$. Herein is n a positive integer modulus. Any element of the commutative ring may be represented in the chosen encoding. Not all commutative rings allow all elements to be represented in a given encoding, e.g., as a given type of integer list representation. Given a commutative ring R we will say that it allows (full) homogenous obfuscation if any element in R may be represented as an integer list using a given encoding type. The person skilled in the art can verify if a given commutative ring allows full homogenous obfuscation given an encoding, e.g., by generating all allowable encodings and verifying that together they represent all elements of a given ring.

Below first a description is given of the example encoding. There are many types of encodings, which have in common that ring elements may be represented as lists of integers. These integers are not ring elements, e.g., even if the ring is not an integer ring say a polynomial ring, then nevertheless elements may be represented as integer lists. The encoding used, how a given integer list maps to a ring element is referred to as the encoding. Typically, the integer lists will always be of the same length, however this is not necessary. Generally, as the encoding allows more types of integer lists, e.g., longer lists, it becomes more likely that a given ring element may be encoded as an integer list in different ways. Given a commutative ring R with the example encoding, there is a special ring element u, such that any element a of R may be written as $u^{a_1}-u^{a_2}$, for some integers $a_1$ and $a_2$. We refer to such a special ring element as a base ring element. Not all commutative rings may be encoded in this manner, but sufficiently many of them are, for the encoding to be useful. The integers $a_1$ and $a_2$ are not themselves ring elements of ring R; they are integers operated upon modulo the order of the base element. Note that that the ring element a equals a linear combination of powers of the base element u, namely of $u^{a_1}$ and $u^{a_2}$; in this case the linear combination is obtained by multiplying the powers with +1 or −1 and summing them, more in particular, by subtracting a second power from a first power. The calculating device operates on ring elements encoded in the above fashion. The addition, negation and multiplication units can operate on ring elements in this encoding.

An increment table T plays a central role both in the addition and multiplication operation. The increment table maps an input ring element, in this case an input ring element may be represented as an integer list. For example, given an input integer list $(k_1, k_2)$ representing the input ring element $k=u^{k_1}-u^{k_2}$ the table T maps this to an output integer-list, e.g. $T((k_1, k_2))=(l_1,l_2)$ encoding an output ring element $l=u^{l_1}-u^{l_2}$ The output ring element equals the increment ring element ring-added to the input ring element. In this example, the increment element may be taken as 1, i.e., the ring element which is the identity for the ring multiplication; in this case l=k+1. It is convenient that the table may be applied directly to ring elements which use the same encoding, and thus which may be applied to ring elements having the integer list representation. Nevertheless, there are embodiments, in which the table is applied to ring elements in an alternative encoding. The alternative encoding may also be an integer list, but of an alternative type. Also the increment ring element need not be 1.

Below the operations negation, addition, and multiplication are described. Negation. Given a negation-input integer-list $(a_1,a_2)$ representing the negation input ring element $a=u^{a_1}-u^{a_2}$, a negation-output integer-list may be obtained by permuting the integer list, in this case by reversing the order. The negation-output integer-list may be $(a_2,a_1)$. Assuming that there exists an m, such that $u^m=-1$, which happens for base elements with an even order, the negation may alternatively be obtained by adding a constant, e.g. m, to each integer of the integer list. In the latter case the negation-output integer-list may be $(a_1+m,a_2+m)$. This works since $-a=u^{a_2}-u^{a_1}=u^{a_1+m}-u^{a_2+m}$. Arithmetic in the integer list is preferably done modulo the order of the base element. Here, an integer of the integer lists corresponds to an exponent of the base element, so integers that are the same module the order of the base element encode the same ring element.

Addition. To add a received first addition-input integer-list $(a_1,a_2)$ encoding a first addition-input ring element $a=u^{a_1}-u^{a_2}$ and a second addition-input integer list $(b_1,b_2)$ encoding a second addition-input ring element $b=u^{b_1}-u^{b_2}$ first an intermediate addition integer-list $((c_1,c_2))$ encoding an intermediate addition ring element c is determined.

The ring element c may be the first addition-input ring element a plus the base element u to a power determined from the second addition input integer list, in particular a first integer of the second addition input integer list. In this example, we may have $c=u^{a_1}-u^{a_2}+u^{b_1}$. To compute the latter we observe that $c=u^{a_1}-u^{a_2}+u^{b_1}=(u^{a_1-b_1}-u^{a_2-b_1}+1)u^{b_1}$. The term in brackets may be rewritten in the encoding using the increment table. Through a first application of the increment table to the ring element $u^{a_1-b_1}-u^{a_2-b_1}$ an element $u^{d_1}-u^{d_2}=u^{a_1-b_1}-u^{a_2-b_1}+1$ is obtained. For example, by $T((a_1-b_1, a_2-b_1))=(d_1,d_2)$. We then have that $c_1=d_1+b_1$ and $c_2=d_2+b_1$; This shows that determining the intermediate addition integer-list $((c_1,c_2))$ may further comprise adding an integer determined from the second addition-input integer-lists to the integers in the integer-list resulting from first application. Adding $u^{b_1}$ to a ring element in integer list representation, in this case, to a, is sometimes referred to as the positive reduction step.

The addition unit has obtained intermediate addition ring element $c=u^{a_1}-u^{a_2}+u^{b_1}=u^{c_1}-u^{c_2}$, as the integer-list $(c_1,c_2)$. The intermediate addition ring element is thus a linear combination of powers of one or more base elements wherein the powers are determined from the first and second addition-input integer-lists. In this case the increment table is applied to the ring-element $u^{a_1-b_1}-u^{a_2-b_1}$ formed by the one or more base ring elements (u) raised to the power of a first integer of the first integer list $(a_1)$ minus a first integer of the second integer list $(b_1)$ minus the base ring element (u)

raised to the power of a second integer of the first integer list ($a_2$) minus the first integer of the second integer list ($b_1$).

In this example, the addition-output integer-list may be determined through a second application of the increment table to ring elements determined from the intermediate addition integer-list and the second addition-input integer-list. This may comprise computing the sum of intermediate addition ring element c and minus the base element raised to a power determined from the second addition input integer list, e.g. the second integer of the second addition input integer list $b_2$: $c-u^{b_2}=u^{c_1}-u^{c_2}-u^{b_2}$. This may be accomplished by negating the intermediate addition ring-element represented by the intermediate addition integer-list before the second application of the increment table. The negating of c may be done as indicated above. As an example we use permuting, but the same operation may be performed by adding a constant to the exponent. After negating, the sum may use plus (instead of minus) the base element raised to a power determined from the second addition input integer list: $-c+u^{b_2}=u^{c_2}-u^{c_1}+u^{b_2}$. The latter operation is of the same type as above, and can be performed through a table application in the same manner as adding $u^{b_1}$. After this the result is negated again. The full addition may use two negations and two table applications, of the same increment table T.

Subtracting $u^{b_2}$ from a ring element in integer list representation (i.e. adding $-u^{b_2}$), in this case from c, is sometimes referred to as the negative reduction step. The negative reduction step may be performed by negating, performing the positive reduction step, and negating again.

There are many variants, some of which are described in the previous application. For example, a variant is to use $c=u^{a_1}+u^{b_1}-u^{a_2}=(u^{a_1-a_2}+u^{b_1-a_2}-1)u^{a_2}$. In this example, the increment element is $-1$. The inputs to the increment table may be $a_1-a_2$ and $b_1-a_2$. Although the latter may be written as an integer list, the integer element represented by them ($u^{a_1-a_2}+u^{b_1-a_2}$) uses a different encoding than the operands (e.g., $u^{a_1}-u^{a_2}$).

Multiplication. To multiply the received first multiplication-input integer-list ($r_1,r_2$) encoding a first multiplication-input ring element $r=u^{r_1}-u^{r_2}$ and a second multiplication-input integer list ($(s_1,s_2)$) encoding a second multiplication-input ring element $s=u^{s_1}-u^{s_2}$, a first intermediate multiplication integer-list ($t_1,t_2$) and a second intermediate multiplication integer-list ($u_1,u_2$) are determined. A multiplication-output integer-list encoding a multiplication-output ring element is determined from the first and second intermediate element. In other embodiments, there may be more than two intermediate multiplication integer lists. We have that $r \cdot s = (u^{r_1}-u^{r_2})(u^{s_1}-u^{s_2}) = u^{r_1+s_1}-u^{r_1+s_2}+u^{r_2+s_2}-u^{r_2+s_1} = (u^{r_1+s_1}-u^{r_1+s_2})+(u^{r_2+s_2}-u^{r_2+s_1})=t+u$. Partitioning the terms in the expanded products over two terms t and u may be done in different ways, e.g., as $(u^{r_1+s_1}-u^{r_2+s_1})+(u^{r_2+s_2}-u^{r_1+s_2})$.

This shows that to multiply two ring elements represented as integer lists they may be transformed into two new integer lists that can be added to obtain the answer to the multiplication. The addition may be done as described above. For example, the multiplication unit may compute the intermediate integer lists and send them to the multiplication unit.

For example, a first integer $t_1$ of the first intermediate multiplication integer-list may comprise a first integer $r_1$ of the first multiplication-input integer-list plus a first integer $s_1$ of the second multiplication-input integer-list, and a second integer $t_2$ of the first intermediate multiplication integer-list may comprise a first integer $r_1$ of the first multiplication-input integer-list plus a second integer $s_2$ of the second multiplication-input integer-list $t_1=r_1+s_1$, $t_2=r_1+s_2$; A first integer $u_1$ of the second intermediate multiplication integer-list may comprise a second integer $r_2$ of the first multiplication-input integer-list plus a second integer $s_2$ of the second multiplication-input integer-list, and a second integer $u_2$ of the second intermediate multiplication integer-list may comprise a second integer $r_2$ of the first multiplication-input integer-list plus a first integer $s_1$ of the second multiplication-input integer-list $u_1=r_2+s_2$, $u_2=r_2+s_1$, In an embodiment, e.g., in the example just disclosed, the arithmetic is performed on integer lists, the ring elements do not need to be calculated as ring elements in some natural representation. Now a number of the variants are discussed. Many of the variants are independent, e.g., a variant encoding may be combined with a variant to perform addition.

Through the obfuscated arithmetic when calculations are performed in the integer list, corresponding e.g. to $u^{a_1-b_1}$, etc, the value may be reduced modulo the order of u. For example, if the order of u is 30, all computations may be performed mod 30. It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic calculating device comprising:
    a hardware processor arranged to perform obfuscated arithmetic in a commutative ring ($Z_M$; $Z_n[x]/M(x)$) defined by a combined modulus (M; M(x)) in a residue number system, the residue number system being defined for a series of moduli ($m_1, m_2, \ldots, m_N$), each modulus defining a commutative ring ($Z_{m_i}$; $Z_n[x]/m_1(x)$), such that for each modulus ($m_i$) of the series there exists an associated base element ($u_i$) satisfying the condition that each ring element ($x_j$) modulo the modulus ($m_j$) may be expressed as an integer-list (($a_j$, $b_1$)), wherein the ring elements equal a linear combination of powers of the base element ($x_j=u_i^{a_j}-u_i^{b_j}$), and wherein each power has an exponent determined by the integer-list;
    an operand storage device arranged to store one or more operands modulo the combined modulus (M) as one or more series of ring elements modulo the moduli, each ring element of a series being associated with a corresponding modulus of the series of moduli, wherein at least one ring element of the series is encoded as an integer-list; and
    calculation circuitry arranged to add and/or multiply a first and second operand of the operand storage device according to the residue number system, wherein obfuscation via the obfuscated arithmetic in the residue number system includes homogeneous obfuscation, wherein the homogeneous obfuscation renders unknown whether addition or multiplication operations are performed, when viewed from outside the electronic calculating device, since the addition and multiplication operations will appear to be the same operation.

2. The electronic calculating device as in claim 1, wherein the combined modulus and the moduli in the series of moduli are integers or polynomials with modular coefficients.

3. The electronic calculating device as in claim 1, wherein the calculation circuitry operates on said integer-list via modulo-operations modulo the order of the base elements, the order of at least two base elements associated with two different moduli of the series of moduli being equal.

4. The electronic calculating device as in claim 1, wherein the order of all base elements associated with the moduli of the series of moduli are equal.

5. The electronic calculating device as in claim 1, wherein the combined modulus equals the least common multiple of the moduli ($m_1, m_2, \ldots, m_N$) in the series of moduli.

6. The electronic calculating device as in claim 1, further comprising:
a table storage device arranged to store, for each of the moduli in the series, an increment table (T) defined for an increment element ($-1; 1; u^t$), associated to a modulus of the series of moduli,
the increment table mapping an input ring element ($k=u^{k_1}-u^{k_2}$) to an output integer-list ($T((k_1, k_2))=(l_1, l_2)$) encoding an output ring element ($l=u^{l_1}-u^{l_2}$), wherein the output ring element equals the increment element added to the input ring element ($l=k+1$), the output ring element equals a linear combination of powers of the base element (u), wherein the powers have exponents determined by the output integer-list.

7. The electronic calculating device as in claim 6, wherein the calculation circuitry is arranged to perform arithmetic on a first and second ring element in the first and second operand modulo the same modulus and represented as an integer list, the arithmetic including a modulo-operation modulo the order of the base element associated with the same modulus and arranged to apply the increment table associated stored for the same modulus.

8. The electronic calculating device as in claim 6, wherein the calculation circuitry comprises
addition circuitry arranged to perform for each moduli of the series
receive a first addition-input integer-list (($a_1, a_2$)) encoding a first addition-input ring element and a second addition-input integer list (($b_1, b_2$)) encoding a second addition-input ring element, and
determine an addition-output integer-list encoding an addition-output ring element by applying the increment table to ring elements determined from the first and second addition-input integer-lists, the addition-output ring element being equal to the modular addition of the first addition-input ring element and the second addition-input ring element.

9. The electronic calculating device as in claim 8, wherein determining the addition-output integer-list comprises
determining an intermediate addition integer-list (($c_1, c_2$)) encoding an intermediate addition ring element by a first application of the increment table to a ring element ($u^{a_1-b_1}-u^{a_2-b_1}$) being a linear combination of powers of one or more base elements wherein the powers are determined from the first and second addition-input integer-lists, ($u^{c_1}-u^{c_2}=u^{a_1}-u^{a_2}+u^{b_1}$) and a modulo-operation modulo the order of the base element,
determining the addition-output integer-list that comprises a second application of the increment table to ring elements determined from the intermediate addition integer-list and determined from the second addition-input integer-list and a modulo-operation modulo the order of the base element.

10. The electronic calculating device as in claim 9, wherein
determining the intermediate addition integer-list (($c_1, c_2$)) further comprises adding an integer determined from the first and second addition-input integer-lists to the integers in the integer-list resulting from first application a modulo-operation modulo the order of the base element.

11. The electronic calculating device as in claim 9, Wherein
the increment table is applied to the ring-element ($u^{a_1-b_1}-u^{a_2-b_1}; u^{a_1-b_1}+u^{a_2-b_1}$) formed by the one or more base ring elements (u) raised to the power of a first integer of the first integer list ($a_1$) minus a first integer of the second integer list ($b_1$) plus or minus a base ring element (u) raised to the power of a second integer of the first integer list ($a_2$) minus the first integer of the second integer list ($b_1$); and/or
the increment table is applied to the ring-element ($u^{a_1-a_2}+u^{b_1-a_2}; u^{a_1-a_2}+u^{b_1-a_2}$) formed by the one or more base ring element (u) raised to the power of a first integer of the first integer list ($a_1$) minus a second integer of the first integer list ($a_2$) plus or minus a base ring element (u) raised to the power of a first integer of the second integer list ($b_1$) minus the second integer of the first integer list ($a_2$); and/or
the increment table is applied to the ring-element ($u^{b_1-a_1}-u^{a_2-a_1}; u^{a_2-a_1}+u^{b_1-a_1}$) formed by the one or more base ring element (u) raised to the power of a second integer of the first integer list ($a_2$) minus a first integer of the first integer list ($a_1$) plus or minus a base ring element (u) raised to the power of a first integer of the second integer list ($b_1$) minus the first integer of the first integer list ($a_1$).

12. The electronic calculating device as in claim 9, wherein
the intermediate addition ring-element represented by the intermediate addition integer-list is negated before the second application of the increment table.

13. The electronic calculating device as in claim 6, wherein the calculation circuitry comprises
multiplication circuitry arranged to
receive a first multiplication-input integer-list (($r_1, r_2$)) encoding a first multiplication-input ring element and a second multiplication-input integer list (($s_1, s_2$)) encoding a second multiplication-input ring element, and
determine a multiplication-output integer-list encoding a multiplication-output ring element by applying the increment table to ring elements determined from the first and second multiplication-input integer-lists, the multiplication-output ring element being equal to the modular multiplication of the first multiplication-input ring element and the second multiplication-input ring element.

14. The electronic calculating device as in claim 1, wherein the hardware processor and the calculation device are embodied by one and the same item of hardware.

15. An electronic calculating method comprising: performing,
- via a hardware processor, obfuscated arithmetic modulo a combined modulus (M) in a residue number system, the residue number system being defined for a series of moduli ($m_1, m_2, \ldots, m_N$), each modulus defining a commutative ring ($Z_{m_1}$; $Z_n[x]/m_1(x)$), wherein for each modulus ($m_i$) of the series there exists an associated base element ($u_i$) satisfying the condition that each ring element ($x_j$)

modulo the modulus ($m_j$) may be expressed as an integer-list (($a_j$, $b_j$)) such that the ring elements equal a linear combination of powers of the base element ($x_j = u_i^{a_j} - u_i^{b_j}$), wherein each power has an exponent determined by the integer-list;
- storing, via an operand storage device, one or more operands modulo the combined modulus (M) as one or more series of ring elements modulo the moduli, each ring element of a series being associated with a corresponding modulus of the series of moduli, wherein at least one ring element of the series is encoded as an integer-list; and
- performing, via calculation circuitry, one or more of add and/or multiply a first and second operand of the operand storage device according to the ring element number system, wherein obfuscation via the obfuscated arithmetic in the residue number system includes homogeneous obfuscation, wherein the homogeneous obfuscation renders unknown whether addition or multiplication operations are performed, when viewed from outside the electronic calculating method, since the addition and multiplication operations will appear to be the same operation.

16. The electronic calculating method as in claim 15, wherein performing, via the hardware processor, the obfuscated arithmetic modulo a combined modulus (M) in a residue number system and performing, via calculation circuitry, one or more of the add and/or multiply a first and second operand of the operand storage device according to the ring element number system, are performed by one and the same item of hardware.

17. A non-transitory computer readable medium embodied with a computer program that comprises a set of instructions executable by a programmable apparatus to perform an electronic calculating method when the computer program is run on the programmable apparatus, the electronic calculating method comprising:
- performing, via a hardware processor, obfuscated arithmetic modulo a combined modulus (M) in a residue number system, the residue number system being defined for a series of moduli ($m_1, m_2, \ldots, m_N$), each modulus defining a commutative ring ($Z_{m_1}$; $Z_n[x]/m_1(x)$), wherein for each modulus ($m_i$) of the series there exists an associated base element ($u_i$) satisfying the condition that each ring element ($x_j$) modulo the modulus ($m_j$) may be expressed as an integer-list (($a_j$, $b_j$)) such that the ring elements equal a linear combination of powers of the base element ($x_j = u_i^{a_j} - u_i^{b_j}$), wherein each power has an exponent determined by the integer-list;
- storing, via an operand storage device, one or more operands modulo the combined modulus (M) as one or more series of ring elements modulo the moduli, each ring element of a series being associated with a corresponding modulus of the series of moduli, wherein at least one ring element of the series is encoded as an integer-list; and
- performing, via calculation circuitry, one or more of add and/or multiply a first and second operand of the operand storage device according to the ring element number system, wherein obfuscation via the obfuscated arithmetic in the residue number system includes homogeneous obfuscation, wherein the homogeneous obfuscation renders unknown whether addition or multiplication operations are performed, when viewed from outside the electronic calculating method, since the addition and multiplication operations will appear to be the same operation.

* * * * *